(12) United States Patent
Selby

(10) Patent No.: US 9,421,625 B2
(45) Date of Patent: Aug. 23, 2016

(54) RECIPROCATING SAW WITH ADJUSTABLE SHOE

(71) Applicant: Milwaukee Electric Tool Corporation, Brookfield, WI (US)

(72) Inventor: David A. Selby, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 424 days.

(21) Appl. No.: 13/918,122

(22) Filed: Jun. 14, 2013

(65) Prior Publication Data

US 2013/0333231 A1    Dec. 19, 2013

Related U.S. Application Data

(60) Provisional application No. 61/659,646, filed on Jun. 14, 2012.

(51) Int. Cl.
  *B23D 49/10*    (2006.01)
  *B23D 49/16*    (2006.01)

(52) U.S. Cl.
  CPC .................................. *B23D 49/167* (2013.01)

(58) Field of Classification Search
  CPC ...... B23D 49/10; B23D 49/167; B23D 51/10; B23D 51/14
  USPC ........ 30/371, 374, 376, 377, 392–394; D8/64
  See application file for complete search history.

(56) References Cited

U.S. PATENT DOCUMENTS

| | | | |
|---|---|---|---|
| 1,035,524 A * | 8/1912 | Bradley | B23D 49/167 30/392 |
| 3,360,021 A * | 12/1967 | Mejia | B23D 49/167 D8/64 |
| 3,496,972 A * | 2/1970 | Rees | B23D 49/167 30/376 |
| 3,528,463 A * | 9/1970 | Mejia | B23D 49/167 30/392 |
| 5,007,172 A | 4/1991 | Palm | |
| 5,134,777 A * | 8/1992 | Meyer | B23D 49/167 30/392 |
| 5,185,934 A * | 2/1993 | Tillman | B23D 51/16 30/393 |
| 5,421,091 A | 6/1995 | Gerritsen, Jr. | |
| 5,450,925 A * | 9/1995 | Smith | B23D 49/167 30/394 |
| 5,555,626 A * | 9/1996 | Fuchs | B23D 51/16 30/392 |
| 5,724,741 A | 3/1998 | Bednar | |
| 5,819,420 A * | 10/1998 | Collins | B23D 51/02 30/374 |
| 5,855,070 A * | 1/1999 | Grabowski | B23D 49/167 30/392 |
| 6,249,979 B1 | 6/2001 | Bednar et al. | |
| 6,272,757 B1 | 8/2001 | Roe | |
| 6,308,423 B1 * | 10/2001 | Ono | B23D 49/167 30/392 |
| 6,317,988 B1 * | 11/2001 | Tachibana | B23D 49/167 30/392 |

(Continued)

FOREIGN PATENT DOCUMENTS

EP    0669181 A1    8/1995
EP    0669181 B1    4/1998

(Continued)

*Primary Examiner* — Jason Daniel Prone
(74) *Attorney, Agent, or Firm* — Michael Best & Friedrich LLP

(57) ABSTRACT

A reciprocating power tool has a shoe that can be adjusted while the reciprocating power tool is in use. The reciprocating power tool has a main body, a first grip, a second grip moveable with respect to the main body, and a shoe for engaging a workpiece. The shoe is coupled to the second grip such that the shoe moves with the second grip for adjustment of a position of the shoe when the second grip is moved with respect to the main body.

18 Claims, 1 Drawing Sheet

(56) References Cited

U.S. PATENT DOCUMENTS

| | | | | |
|---|---|---|---|---|
| 6,484,409 B2 * | 11/2002 | Campbell | B23D 49/162 | 30/374 |
| 6,550,147 B1 * | 4/2003 | Fishlock | B23D 49/11 | 30/371 |
| 6,851,193 B2 | 2/2005 | Bednar et al. | | |
| 7,082,687 B2 * | 8/2006 | Wang | A01G 3/067 | 30/271 |
| 7,082,689 B2 * | 8/2006 | Beville | B23D 49/167 | 30/392 |
| 7,168,169 B2 * | 1/2007 | Moreno | B23D 51/16 | 30/394 |
| 7,188,425 B2 | 3/2007 | Bednar et al. | | |
| 7,310,880 B2 * | 12/2007 | Hartmann | B23D 49/167 | 30/392 |
| 7,395,603 B2 * | 7/2008 | Sugiura | B23D 51/02 | 30/392 |
| 7,426,786 B2 * | 9/2008 | Beville | B23D 49/167 | 30/392 |
| 7,437,824 B2 * | 10/2008 | Chreene | B23D 49/167 | 30/392 |
| 7,963,043 B2 * | 6/2011 | Chen | B23D 49/167 | 30/392 |
| 7,971,362 B2 * | 7/2011 | Haas | B23D 51/02 | 30/392 |
| 8,006,392 B2 * | 8/2011 | Moreno | B23D 49/167 | 30/392 |
| 8,220,165 B2 * | 7/2012 | Gadams | B23D 51/02 | 30/392 |
| 8,230,605 B2 * | 7/2012 | Oberheim | B23D 51/02 | 30/392 |
| 8,407,902 B2 | 4/2013 | Naughton et al. | | |
| 8,549,759 B2 * | 10/2013 | Bertsch | B23D 53/12 | 30/286 |
| 8,549,760 B2 * | 10/2013 | Bertsch | B23D 53/12 | 30/286 |
| 8,776,383 B2 * | 7/2014 | Sergyeyenko | B23D 49/167 | 30/392 |
| 9,038,277 B2 * | 5/2015 | Steele | B23D 49/167 | 30/371 |
| 2001/0034941 A1 | 11/2001 | Bednar et al. | | |
| 2004/0187321 A1 * | 9/2004 | Hartmann | B23D 51/02 | 30/392 |
| 2005/0039339 A1 * | 2/2005 | Chen | B23D 51/10 | 30/392 |
| 2005/0132583 A1 | 6/2005 | Bednar et al. | | |
| 2005/0246905 A1 * | 11/2005 | Tozawa | B23D 51/00 | 30/392 |
| 2007/0251104 A1 * | 11/2007 | Heinrichs | B23D 49/105 | 30/392 |
| 2008/0104853 A1 * | 5/2008 | Hunger | B27G 19/006 | 30/392 |
| 2009/0223071 A1 | 9/2009 | Alberti et al. | | |
| 2010/0162579 A1 | 7/2010 | Naughton et al. | | |
| 2011/0010951 A1 | 1/2011 | Harrison et al. | | |
| 2011/0083330 A1 | 4/2011 | Steele et al. | | |
| 2013/0014968 A1 | 1/2013 | Kehoe et al. | | |
| 2013/0019483 A1 | 1/2013 | Naughton et al. | | |
| 2013/0174428 A1 | 7/2013 | Naughton et al. | | |

FOREIGN PATENT DOCUMENTS

EP 1527837 A1 * 5/2005
WO WO 2012094997 A1 * 7/2012

* cited by examiner

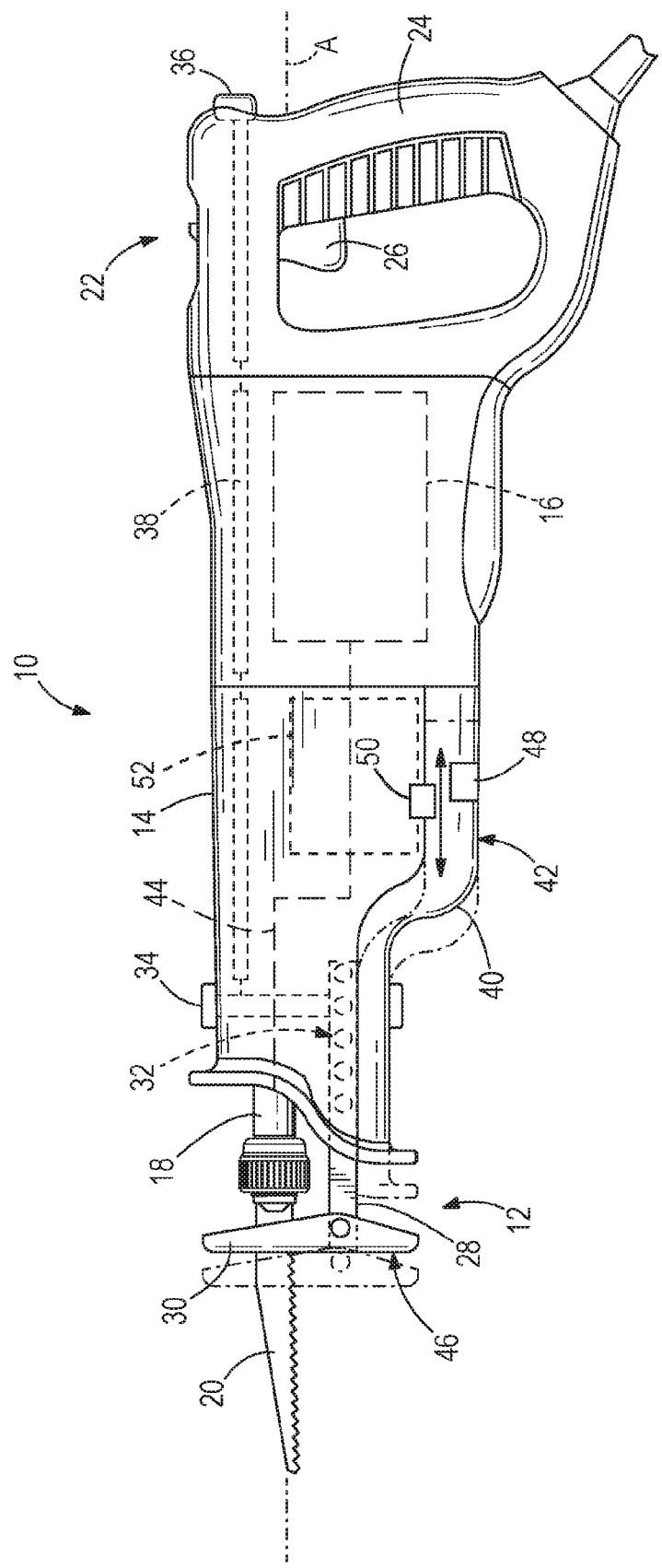

RECIPROCATING SAW WITH ADJUSTABLE SHOE

CROSS REFERENCE TO RELATED APPLICATIONS

This application claims priority to U.S. Provisional Patent Application No. 61/659,646 filed on Jun. 14, 2012, the entire contents of which are incorporated herein by reference.

BACKGROUND

The present invention relates to a reciprocating saw, and, more particularly, to an adjustable shoe for a saw.

Shoes for reciprocating saws typically include a flat or planar surface for engaging a work piece. The planar surface is positioned transverse to a blade of the reciprocating saw. The reciprocating saw is held by a user and positioned by the user with respect to the work piece. The shoe acts as a stop to limit the depth of the saw blade into the work piece and to prevent the work piece from engaging the saw blade at a connection of the saw blade to the tool. Reciprocating saws cut most effectively when the shoe is pressed tightly to the work piece. Often, users need to adjust the shoe to control their depth of cut to avoid bending blades or cutting unintended material behind the surface being cut. Blade wear area is dictated by the shoe position. Additional blade life can be achieved by moving the shoe in our out. In spite of all the benefits of adjusting reciprocating saw shoe depth, users typically do not make regular adjustments because adjustment requires work stoppage and three or more operations to achieve.

SUMMARY

In one aspect, the invention provides a reciprocating power tool having a main body, a first grip, a second grip moveable with respect to the main body, and a shoe for engaging a workpiece. The shoe is coupled to the second grip such that the shoe moves with the second grip for adjustment of a position of the shoe when the second grip is moved with respect to the main body.

In another aspect, the invention provides a method of adjusting a shoe on a reciprocating power tool. The method includes gripping the reciprocating power tool with a first hand on a first grip, gripping the reciprocating power tool with a second hand on a second grip, and adjusting the shoe by moving the second grip relative to a main body of the reciprocating power tool.

In yet another aspect, the invention provides a method of adjusting a shoe on a reciprocating power tool. The method includes gripping the reciprocating power tool with a first hand on a first grip, gripping the reciprocating power tool with a second hand on a second grip, activating the reciprocating power tool with the first hand, and adjusting the shoe with the second hand while the reciprocating power tool is activated.

In yet another aspect, the invention provides a repositioning system for repositioning a shoe with respect to a main body of a reciprocating saw. The repositioning system is actuatable while a user is using the saw to perform a cutting operation. The user activates the reciprocating saw by depressing a trigger that causes the blade to reciprocate and simultaneously actuates a release element using the same hand. Then, the user repositions the shoe to a new axial position using a second hand while the second hand supports the saw during the cutting operation.

In yet another aspect, the invention provides a power tool including a main body having a motor configured to transfer motion to a cutting blade and a shoe extending from the main body. The shoe is axially movable in an unlocked state between a plurality of axial positions and secured in a locked state. The tool includes a grip portion and a trigger disposed proximate the grip portion for activating the motor. The tool also includes a release element coupled to the shoe for actuating the unlocked state such that the shoe is axially movable when the release element is actuated. The tool also includes a sliding member coupled to the shoe and including a gripping surface for moving the shoe axially while the release element is actuated. The release element is positioned adjacent one of the grip portion and the gripping surface.

Other aspects of the invention will become apparent by consideration of the detailed description and accompanying drawing.

BRIEF DESCRIPTION OF THE DRAWINGS

FIG. 1 is a side view of an adjustable shoe assembly for a reciprocating saw according to one construction of the invention.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting.

DETAILED DESCRIPTION

FIG. 1 illustrates a power tool, such as a reciprocating saw 10, having a shoe assembly 12 and defining a longitudinal axis A. The reciprocating saw 10 generally includes a main body 14 and a motor 16 provided with power, e.g., via an electric cord (an AC version), a battery pack (a DC version), a source of compressed air (a pneumatic version), etc. A drive mechanism 44 converts rotational motion of the motor 16 to reciprocating motion of a reciprocating spindle 18 to reciprocate a saw blade 20 in a direction substantially parallel to the longitudinal axis A of the tool 10. The reciprocating saw 10 also includes a handle assembly 22 positioned at a distal end of the main body 14 opposite the shoe assembly 12. The handle assembly 22 includes a grip portion 24 and a trigger 26 adjacent the grip portion 24 for activating the motor 16. The trigger 26 is positioned such that a user can actuate the trigger 26 using the same hand that is holding the grip portion 24, for example, with an index finger.

The shoe assembly 12 includes a shoe post 28 and a shoe 30. The shoe 30 is pivotally mounted on a distal end of the shoe post 28 away from the main body 18. In other constructions, the shoe 30 may be fixedly mounted to the shoe post 28, or mounted in other suitable ways. In other constructions, other types of shoe assemblies may be employed. The shoe assembly 12 is secured relative to the main body 14 of the reciprocating saw 10 and provides a guiding surface 46 for resting the tool 10 against a workpiece (not shown) during cutting operations. The shoe assembly 12 includes the longitudinally-extending shoe post 28, extending substantially parallel to the longitudinal axis A of the tool 10, which is at least partially disposed within an orifice of the main body 14 of the tool 10. The shoe post 28 is axially movable relative to the main body 14 of the tool 10 in a direction substantially parallel to the axis A and includes a locking mechanism 32 for stabilizing the shoe assembly 12 in one of a plurality of axial positions relative to the main body 14. For example, the locking mechanism 32 may include a pin rotatable between a locking position and a release position. In other constructions, the locking mechanism 32 may include a ball detent system. In other constructions, other suitable types of locking mechanisms may be employed, such as magnets, cams, other types of detent mechanisms, etc.

A release member 34 is positioned on the main body 14 and is coupled to the locking mechanism 32 for releasing the locking mechanism 32. The release member 34 is movable from a locked position for securing the locking mechanism 32 to the shoe assembly 12 to an unlocked position for releasing the locking mechanism 32 from the shoe assembly 12 such that the shoe assembly 12 is free to move axially with respect to the main body 14. In some constructions, the release member 34 includes a biasing member (not shown) for biasing the release member 34 to the locked position. In the illustrated construction, the release member 34 is depressible. In other constructions, the release member 34 may be actuatable in other ways, such as rotatable, slidable, etc. Other suitable configurations for locking and unlocking the shoe assembly 12 may be employed.

The handle assembly 22 also includes a release element 36 positioned adjacent the grip portion 24, the release element 36 for releasing the shoe post 28 such that the shoe assembly 12 is movable with respect to the main body 14. In some constructions, the release element 36 may be linked to the release member 34. In other constructions, the release element 36 may be provided instead of the release member 34, or in addition to and independent of the release member 34. In the illustrated construction, the release element 36 is positioned on a side of the grip portion 24 opposite the trigger 26. In this construction, the release element 36 is suitable for being actuated by the user's thumb, for example. In other constructions, the release element 36 may be positioned on another side of the grip portion 24 relative to the trigger 26, such as on the same side, on an adjacent side or on a perpendicular side. In yet other constructions, the release element 36 may be positioned adjacent a sliding member 40, which will be described in greater detail below.

In the illustrated construction, the release element 36 is coupled to the linkage 38, which may in turn be coupled to the release member 34, which is in turn coupled to the locking mechanism 32, for releasing the locking mechanism 32. The release element 36 is movable from a locked position for securing the locking mechanism 32 to the shoe assembly 12 to an unlocked position for releasing the locking mechanism 32 such that the shoe assembly 12 is free to move, e.g., axially, with respect to the main body 14. In the illustrated construction, the release element 36 is depressible. In other constructions, the release element 36 may be actuatable in other ways, such as rotatable, slidable. etc. In some constructions, the release element 36 includes a biasing member (not shown) for biasing the release element 36 to the locked position. In another construction, the release element 36 is coupled to the locking mechanism 32 for releasing the locking mechanism 32. For example, the release element 36 may be coupled to the locking mechanism 32 by way of a linkage 38, which is in turn coupled to the locking mechanism 32 for releasing the locking mechanism 32.

A sliding member 40 includes a gripping surface 42 and is slidable with respect to the main body 14 in a direction substantially parallel to the longitudinal axis A. The shoe assembly 12 is coupled to sliding member 40 for movement with the sliding member 40. The gripping surface 42 is positioned ergonomically such that the user can slide the sliding member 40 while the user supports the saw 10 at the gripping surface 42. In the illustrated construction, the sliding member 40 is positioned on a bottom side of the reciprocating saw 10, i.e., the side towards which blade teeth of the blade 20 face during normal use, such that the user can slide the sliding member 40 and simultaneously support the saw 10 at the gripping surface 42.

The sliding member 40 is movable with respect to the main body 14 between a retracted position (shown in solid lines in FIG. 1) and an extended position (shown in phantom in FIG. 1). In the retracted position, the sliding member 40 (and the gripping surface 42) is substantially flush with the main body 14 and may appear to be a part of the main body 14. In the extended position, the sliding member 40 (and the gripping surface 42) is extended away from the main body 14. In essence, the sliding member 40 is a part of the main body 14 that is movable with respect to the main body 14. Also, in the extended position, the shoe 30 (and the shoe assembly 12) is extended away from the main body 14 as the shoe assembly 12 is coupled to the sliding member 40 for movement therewith.

The sliding member 40 is movable with respect to the main body 14 by way of a coupling mechanism 50 disposed between the sliding member 40 and the main body 14, such as a detent mechanism (e.g., a ball detent), a magswitch connection between the sliding member 40 and a gearbox 52, a squeeze-initiated release member, etc. The sliding member 40 may be movable between multiple discrete positions or movable continuously between two extremes. The sliding member 40 may include an actuator 48 (e.g., a squeeze-initiated actuator disposed on one or both sides of the sliding member 40) for unlocking the sliding member 40 such that the sliding member 40 is locked with respect to the main body 14 when the actuator 48 is not actuated and is movable with respect to the main body 14 when the actuator 48 is actuated. For example, the actuator 48 may decouple the detent mechanism or release the magnetic connection between the sliding member 30 and the gearbox 52. In other constructions, the sliding member 40 may be movable with respect to the main body 14 by applying a force to the sliding member 40 sufficient to overcome the coupling mechanism 50 (e.g., a coupling force of the detent mechanism) without the use of the actuator 48.

In another construction, the shoe assembly 12 may be movable with respect to the main body 14 by way of the locking mechanism 32 independently of the sliding member 40 such that the shoe assembly 12 is movable with respect to the main body 14 and with respect to the sliding member 40 when the locking mechanism 32 is unlocked. The actuator 48 may be configured to couple the sliding member 40 to the shoe assembly 12 such that movement of the sliding member 40 moves the shoe assembly 12 when the actuator 48 is actuated.

In yet another construction, sliding the sliding member 40 may be the sole means by which the shoe assembly 12 is adjusted.

In operation, the user grips the grip portion 24 of the handle assembly 22 with a first hand and grips the gripping surface 42 with a second hand to stabilize the saw 10. The user activates the motor 16 by actuating the trigger 26 with a finger of the first hand and performs a cutting operation. While the saw 10 is in use, e.g., while the motor 16 is activated, the user actuates the release element 36 with another finger of the first hand, such as a thumb, to release the shoe post 28 from the locking mechanism 32 such that the shoe post 28 is slidable relative to the main body 14 in a direction substantially parallel to the longitudinal axis A. In other constructions, the user may release the release element 36 with the second hand, e.g., when the release element 36 is positioned adjacent the sliding member 40. Then, while the shoe post 28 is unlocked, the user slides the sliding member 40 to a desired axial position in a direction substantially parallel to the longitudinal axis A using the second hand, which is gripping the gripping surface 42 of the sliding member 40. Sliding of the sliding member 40 causes sliding of the shoe assembly 12 because the sliding member 40 and shoe assembly 12 are fixedly coupled. When the shoe 30 reaches a desired axial position, the user returns the release element 36 to the locked position, or releases the release element 36, and the shoe assembly 12 locks in place. Thus, the user adjusts the axial position of the shoe assembly 12 while using the saw 10.

In other constructions, the user slides the sliding member 40 to a desired axial position in a direction substantially parallel to the longitudinal axis A using the second hand, which is gripping the surface 42 of the sliding member 40, without the need for actuating a release element or release member. In some constructions, the user actuates the actuator 48 in order to slide the sliding member 40 to adjust the shoe assembly 12. For example, the user may squeeze the actuator 48 in order to slide the sliding member 40 to adjust the shoe assembly. In this construction, the user activates the saw 10 with one hand and both unlocks the shoe and slides the shoe with the second hand while the second hand supports the saw 10. Thus, the user adjusts the axial position of the shoe assembly 12 while using the saw 10.

To adjust the axial position of the shoe assembly 12, the user may also actuate the release member 34 when not using the saw 10 to perform a cutting operation. When the user actuates the release member 34, the shoe post 28 is free to slide axially with respect to the main housing 14. Since the user is not using the saw 10 to perform a cutting operation, the user has a free hand with which to adjust the shoe post 28 to a new axial position. Then, the user returns the release member 34, or the release member 34 is biased, to the locked position to secure the shoe assembly 12 in the new axial position.

In some constructions, the reciprocating saw 10 need not include the release member 34, as the release element 36 may be sufficient to allow the user to adjust the position of the shoe assembly 12 while the saw is in use and while the saw is not in use.

Thus, the invention provides, among other things, a releasing and repositioning mechanism for adjusting the axial position of a shoe assembly for a reciprocating saw while the user is using the saw. Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A reciprocating power tool comprising:
   a main body;
   a first grip;
   a second grip slidably coupled to the main body for sliding motion with respect to the main body;
   a shoe post; and
   a shoe for engaging a workpiece, the shoe being mounted at a distal end of the shoe post;
   wherein the shoe and shoe post are coupled to the second grip such that the shoe moves with the sliding motion of the second grip for adjustment of a position of the shoe.

2. The reciprocating power tool of claim 1, wherein the second grip is disposed on a bottom side of the main body and configured for a user to support the main body with a hand on the second grip.

3. The reciprocating power tool of claim 2, further comprising:
   a handle, wherein the handle includes the first grip; and
   a trigger adjacent the first grip for activating the power tool.

4. The reciprocating power tool of claim 1, wherein the second grip is movable between a retracted position in which the second grip is substantially flush with the main body and an extended position in which the second grip is extended away from the main body.

5. The reciprocating power tool of claim 1, further comprising a coupling mechanism for selectively locking a position of the second grip with respect to the main body.

6. The reciprocating power tool of claim 5, further comprising an actuator configured to unlock the coupling mechanism such that the second grip is movable with respect to the main body when the actuator is actuated.

7. The reciprocating power tool of claim 1, further comprising a locking mechanism for selectively locking the shoe with respect to the main body.

8. The reciprocating power tool of claim 7, further comprising a release element disposed on or adjacent one of the first grip for actuation by a user's hand on the first grip and the second grip for actuation by a user's hand on the second grip, wherein the release element unlocks the locking mechanism such that the shoe is movable with respect to the main body.

9. A reciprocating power tool comprising:
   a main body generally elongated along a longitudinal axis;
   a reciprocating spindle extending through a front surface of the main body, the reciprocating spindle configured to support a blade for cutting a workpiece substantially on a first side of the front surface, wherein the first side is defined in a first direction extending axially away from the front surface;
   a sliding member axially movable with respect to the main body, the sliding member having a grip surface that is generally parallel to the longitudinal axis, wherein the grip surface is disposed substantially on a second side of the front surface, wherein the second side is defined in a second direction extending axially away from the front surface opposite the first direction; and
   a shoe for engaging a workpiece, the shoe being operatively coupled with the sliding member, wherein axial movement of the sliding member adjusts the shoe in the first and second directions.

10. The reciprocating power tool of claim 9, further comprising a motor operatively coupled to the reciprocating spindle configured to reciprocate in the first and second directions.

11. The reciprocating power tool of claim 9, further comprising a detent mechanism disposed between the sliding member and the main body, wherein the sliding member is movable between a plurality of discrete positions.

12. The reciprocating power tool of claim 9, further comprising:
   a gearbox; and
   a magswitch connection between the sliding member and the gearbox.

13. The reciprocating power tool of claim 9, further comprising an actuator for unlocking the sliding member such that the sliding member is locked with respect to the main body when the actuator is not actuated and is movable with respect to the main body when the actuator is actuated.

14. The reciprocating power tool of claim 9, wherein the sliding member is substantially flush with the main body in a retracted position.

15. A reciprocating power tool comprising:
   a main body generally elongated along a longitudinal axis;
   a motor operatively coupled to a reciprocating spindle configured to reciprocate in a direction substantially parallel to the longitudinal axis;
   a sliding member movable axially with respect to the main body; and
   a shoe for engaging a workpiece, the shoe being operatively coupled with the sliding member, wherein movement of the sliding member adjusts the shoe in a direction substantially parallel to the longitudinal axis, wherein the sliding member includes a grip surface substantially flush with the main body in a retracted position.

16. The reciprocating power tool of claim 15, further comprising a detent mechanism disposed between the sliding member and the main body, wherein the sliding member is movable between a plurality of discrete positions.

17. The reciprocating power tool of claim 15, further comprising:
   a gearbox; and
   a magswitch connection between the sliding member and the gearbox.

18. The reciprocating power tool of claim 15, further comprising an actuator for unlocking the sliding member such that the sliding member is locked with respect to the main body when the actuator is not actuated and is movable with respect to the main body when the actuator is actuated.

* * * * *